Jan. 18, 1955     R. E. A. TÖRNKVIST ET AL     2,699,757
MEASURING AND ACTUATING DEVICE
Filed Sept. 16, 1950     4 Sheets-Sheet 1
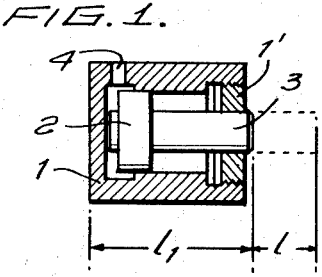
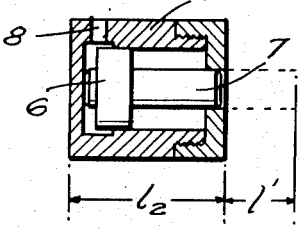
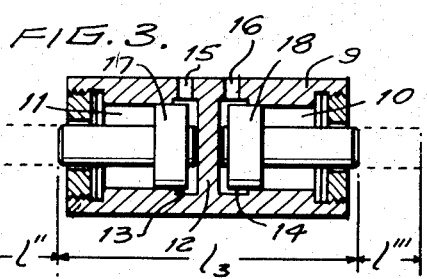
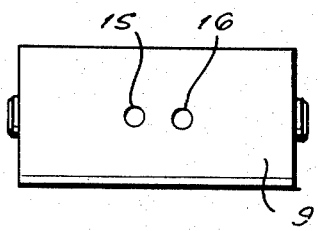
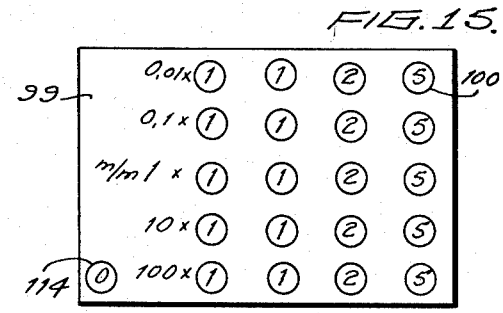
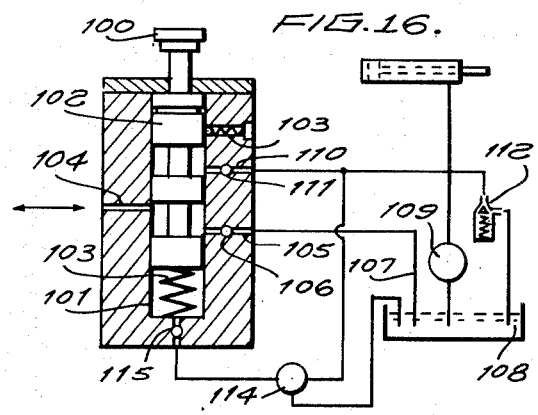
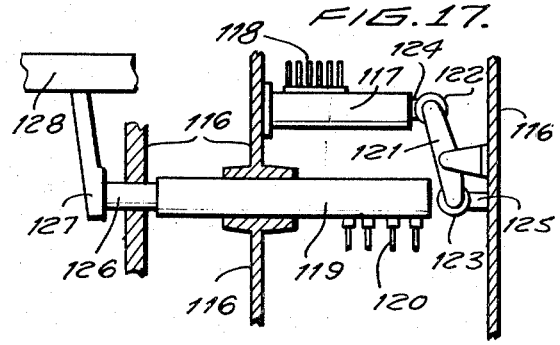
INVENTORS:
ROLF ERIK ALBERT TÖRNKVIST
AND VÄINÖ WILHELM ÖSTERBERG
BY Jan. 18, 1955   R. E. A. TÖRNKVIST ET AL   2,699,757
MEASURING AND ACTUATING DEVICE
Filed Sept. 16, 1950   4 Sheets-Sheet 2
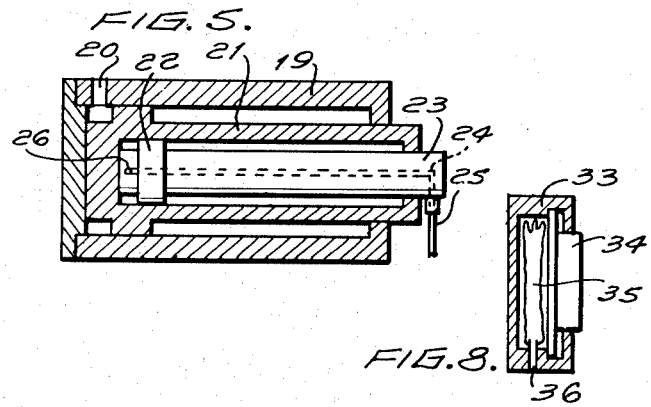
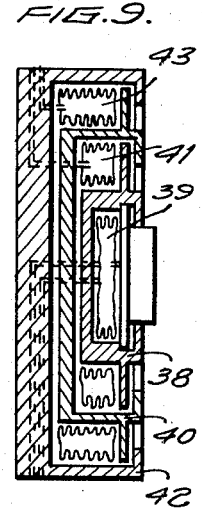
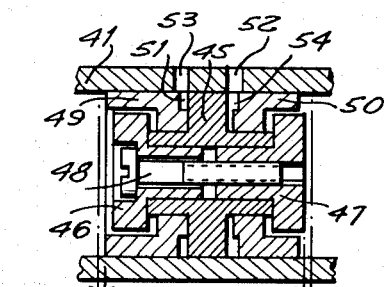
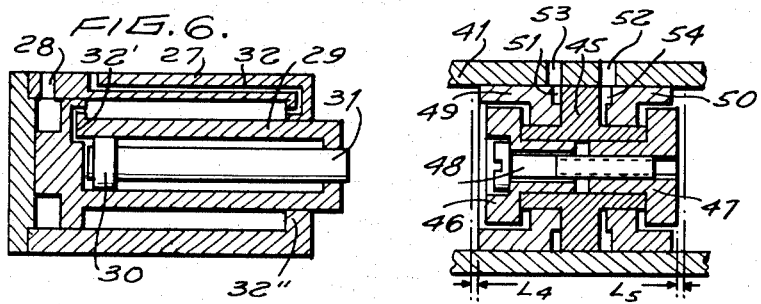
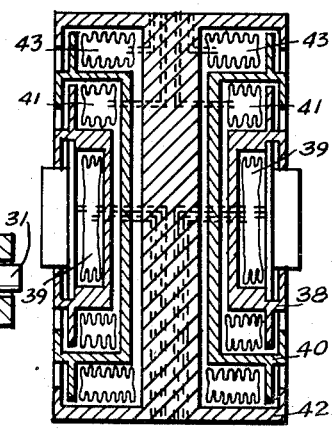
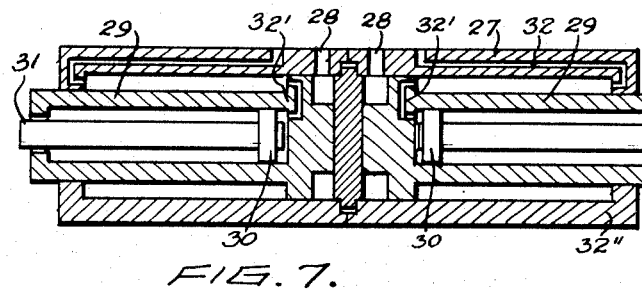
INVENTORS:
ROLF ERIK ALBERT TÖRNKVIST
AND VÄINÖ WILHELM ÖSTERBERG
BY

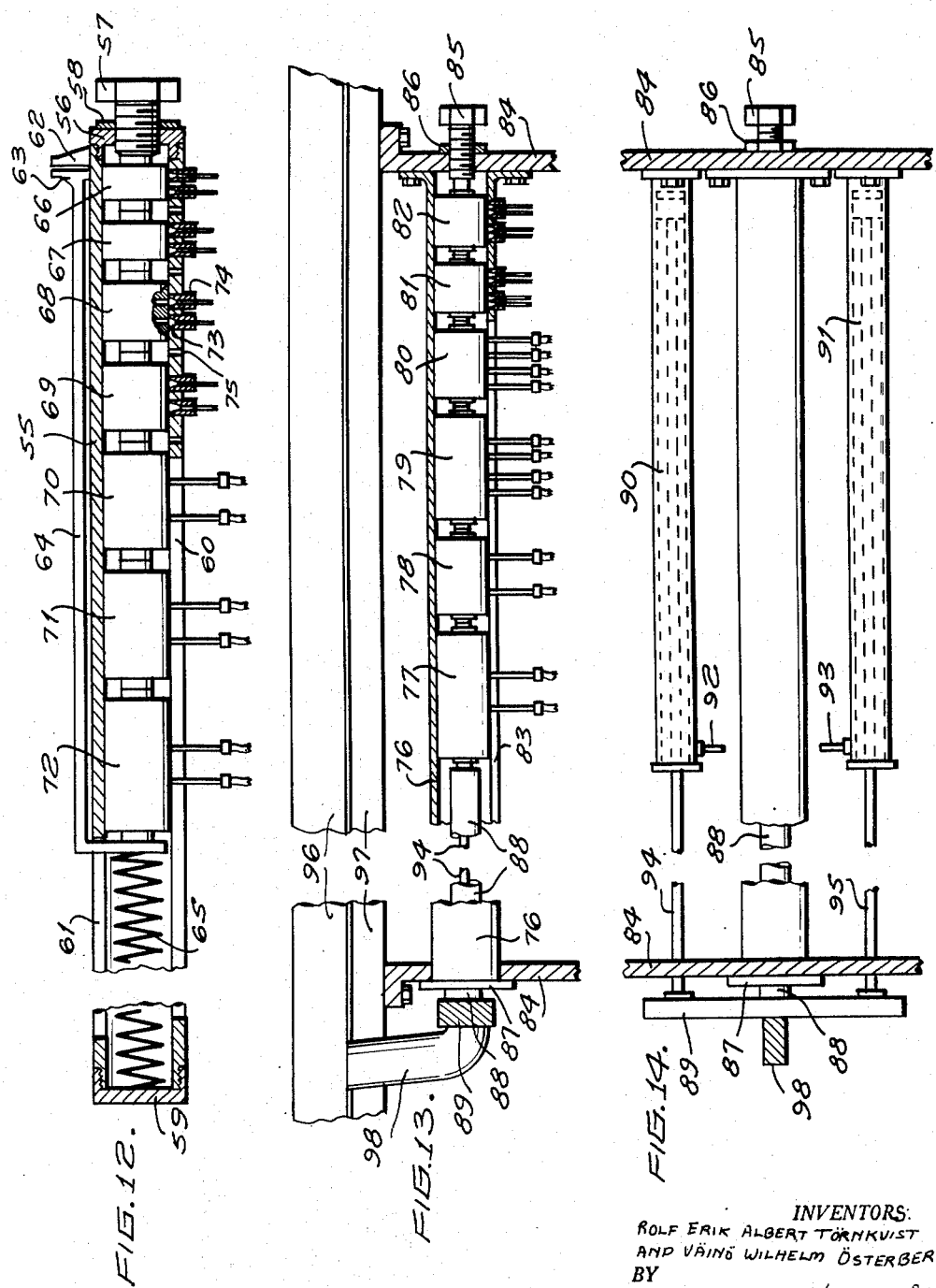

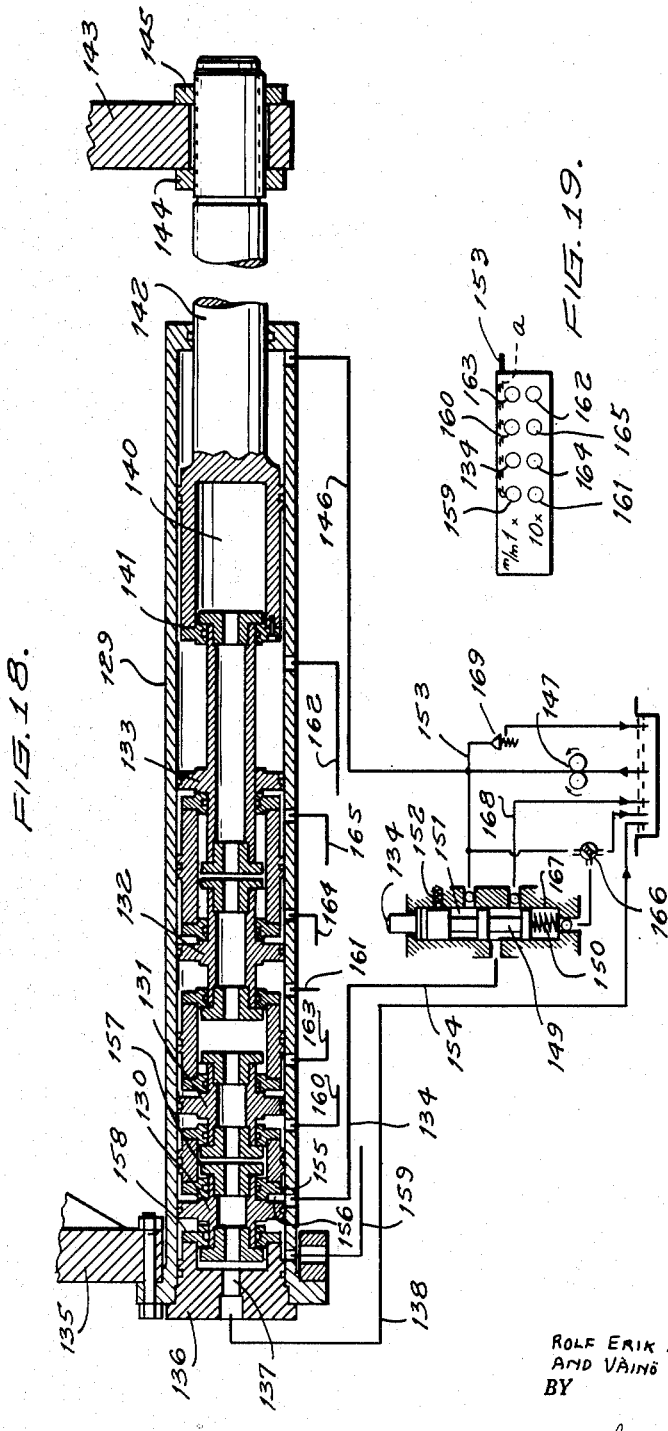

United States Patent Office 2,699,757
Patented Jan. 18, 1955

2,699,757

MEASURING AND ACTUATING DEVICE

Rolf Erik Albert Törnkvist and Väinö Wilhelm Österberg, Helsingfors, Finland, assignors to Osakeyhtiö Tebul Aktiebolag, Helsingfors, Finland, a corporation Application September 16, 1950, Serial No. 185,295

Claims priority, application Sweden September 16, 1949

7 Claims. (Cl. 121—38)

In modern engineering, especially in the machine engineering an accurate measuring of clearances or adjusting of clearance differences is required.

One object of the present invention is to provide a measuring device of high measuring accuracy.

Another object of the invention is to provide an accurate actuating device for machine tools, serving for accurate adjustment of a piece of work in relation to the working tool or vice versa.

The object of the invention is also to provide an accurate actuating device for masses that are quite heavy and consequently difficult to be moved.

With these objects in view the present invention mainly consists in a measuring and actuating device comprising, in combination, supporting means including elongated guiding means; a set of hydraulic units mounted on the guiding means end to end, each of the hydraulic units being longitudinally expandable between two predetermined limits from a compressed condition to an expanded condition, and compressible from an expanded condition to a compressed condition, the hydraulic units constituting a longitudinally expandable and compressible column having a length variable between two predetermined limits; stop means mounted on the supporting means at one end of the elongated guiding means engaging one end of the expandable and compressible column; an actuated member engaging the other end of the column and mounted on the supporting means movably between two positions corresponding to the longitudinal extension of the column in expanded and in compressed condition of the hydraulic units; and a set of fluid supply means supplying an actuating fluid separately to each of the hydraulic units for expanding the same.

A preferred embodiment of the invention comprises the following elements: Supporting means including elongated tubular guiding means formed with a plurality of radial conduits, a set of hydraulic units mounted in the interior of the guiding means end to end, at least two of the hydraulic units including an annular wall member transversely extending through the tubular guiding means and slidably mounted therein, two annular pistons each piston slidably mounted on one side of the transversely extending wall member and defining with the same a chamber communicating with one of the conduits, and two annular stop members mounted on the transversely extending wall member, each of the stop members passing through one of the annular pistons and having a radial projection limiting movement of the associated piston, each of the hydraulic units being longitudinally expandable between two predetermined limits from a compressed condition to an expanded condition, and compressible from an expanded condition to a compressed condition, the hydraulic units constituting a longitudinally expandable and compressible column having a length variable between two predetermined limits; stop means mounted on the supporting means at one end of the elongated guiding means engaging one end of the expandable and compressible column; an actuated member engaging the other end of the column and mounted on the supporting means movably between two positions corresponding to the longitudinal extension of the column in expanded and in compressed condition of the hydraulic units; a set of fluid supply means supplying an actuating fluid through one of said conduits separately to each chamber of the hydraulic units for expanding the same; pressure means abutting at one end thereof against the supporting means and at the other end thereof against the other end of the column and forcing the hydraulic units from expanded to compressed condition; and operating means for separately actuating each of the fluid supply means.

The invention will now be described in the following with reference to the annexed drawings, which illustrate some embodiments of the invention.

Fig. 1 shows a longitudinal section of an embodiment of an expandable and compressible hydraulic unit. Fig. 2 shows a longitudinal section of another embodiment of a hydraulic unit. Fig. 3 shows a longitudinal section of a hydraulic unit composed of two elements illustrated by Fig. 1. Fig. 4 shows the hydraulic unit from Fig. 3 seen from above. Fig. 5 shows a longitudinal section of two hydraulic units according to Fig. 2, which are arranged telescopically within each other. Fig. 6 shows a longitudinal section of another embodiment of the telescopic hydraulic unit according to Fig. 5. Fig. 7 shows a longitudinal section of a double hydraulic unit according to Fig. 6, arranged according to Fig. 4, respectively Fig. 5. Fig. 8 shows a longitudinal section of another embodiment of the hydraulic unit according to Fig. 1. Fig. 9 shows a longitudinal section of a telescopic hydraulic unit device composed of elements according to Fig. 8. Fig. 10 shows a longitudinal section of a double hydraulic unit according to Fig. 9 arranged according to Fig. 7. Fig. 11 shows a longitudinal section of a modified embodiment of a hydraulic unit. Fig. 12 shows a partial section of a hydraulic unit fixed to a gauge. Fig. 13 shows, seen from the side, a partial section of an accurate actuating device for adjustment of the turn-table of a machine tool in relation to the working tool. Fig. 14 is a plan view of the device shown in Fig. 13 without turn-table and guides. Fig. 15 shows an operating plate. Fig. 16 shows a longitudinal section of a pressure medium valve fixed to the operating plate, in enlarged size, as also, schematically, its coupling to the pressure medium system. Fig. 17 is a schematic view of an embodiment of the present invention, Fig. 18 is a longitudinal sectional view of a preferred embodiment, and Fig. 19 shows an operating plate for the device of Fig. 18.

As Fig. 1 shows, the hydraulic unit consists of a cylinder 1 with a piston 2, whose rod projects to the outside of the end surface of the piston 1. In the cylinder bottom there is a pressure medium pipe 4, through which the actuating fluid, e. g. oil, is conducted in and from the cylinder between the piston 2 and the cylinder bottom. The piston being in its initial position—which corresponds to the lower limit of the element i. e. $l_1$—it lies close to the bottom of the cylinder. When oil is conducted into the cylinder the piston moves forward until it reaches the front cylinder and which is a positive stop for the movement of the piston. At this moment the piston rod has projected beyond the position marked with lines of short dashes and the hydraulic unit is in its high limit. The difference between the high limit and the low limit $l$ is the specific and exact distance change of this element.

When producing a hydraulic unit, it is thus absolutely necessary to fit accurately the distance $l$, which in this case can be done by adjusting the distance between the cylinder bottom and the front end flange 1'. This can, for instance, be done by making the flange 1' in the form of a threaded ring which can be screwed in the front end of the cylinder 1. When the clearance wanted for the piston 2 is determined the ring is permanently fastened in its position. The minimum length $l_1$ of the hydraulic unit can be exactly established by smoothing the piston end and the outside of the cylinder bottom. In this manner every distance element can be adjusted permanently to satisfy all practical requirements as to its length changes. The exactness can thus, for instance, be brought up to 0.005 mm.

The cylinder 5 in the hydraulic unit according to Fig. 2 is constructed in the same way as according to Fig. 1. The piston 6 corresponds to the piston 2, but the piston rod 7 does not reach on the outside of the cylinder end when the piston moves to its inner position. This arrangement is advantageous, for adjacent units do not engage the end of the piston rod with its small end face in the initial position of the element—the low limit $l_2$;

but the pressure is distributed in the larger end face of the cylinder end. This is especially advantageous when handling heavy objects, as a higher working pressure is possible. The risk of deformation of the end surfaces of the hydraulic unit is insignificant. The cylinder 5 has the oil duct 8 for the inlet and outlet of the pressure oil. The exact change of length $l'$ is in this case the distance between the exterior end surface of the cylinder end and the end surface of the projecting piston rod—shown in broken lines. The adjustment of the measure change for this type of hydraulic unit is extremely easy, for it requires only a smoothing of the piston rod end. Alternatively the piston rod end can be furnished with an adjusting screw, provided with an end plate and can be locked in the desired position after the adjustment. In this manner one can for instance compensate changes in length caused by wearing. The clearance of the piston within the cylinder is in this case unimportant, provided it is larger than the specific distance change. Although, in the description of the embodiments of the invention in the following figures the hydraulic units are illustrated according to Fig. 1, it is evident that in all cases hydraulic units according to Fig. 2 can be substituted.

According to Figs. 3 and 4 the hydraulic unit is a double element composed of two elements according to Fig. 1. The cylinder body 9 has thus two cylinder chambers 10 and 11 with a cylinder bottom 12, common to both, close to which there is a ring-formed cavity 13, respectively 14, to lead the oil, running through the oil duct 15, respectively 16, behind the pistons 17, respectively 18. As mentioned, the ends of the pistons in the initial position of the element—low limit $l_3$—project a little on the outside of the end surface of the elements. The hydraulic unit in the protruding position of the pistons shown in broken lines illustrate the specific and exact distance alterations $l''$ or $l'''$ or $l''+l'''$ depending whether one of the pistons or whether both pistons are actuated. $l''$ can be, but does not have to be, equal to $l'''$. Such combined elements can be of advantage in cases of small distance alterations because in relation to the total distance alteration the dimensions of the element will be smaller than if two separate distance elements would be used.

Especially for larger distance alterations, it is, however, of advantage to use hydraulic units of piston-cylinder type fixed telescopically one within another. Figs. 5, 6, and 7 show as an example embodiments with two distance elements fixed telescopically in relation to each other. In this way the minimum dimensions of the element are very small in relation to the high limit which can be obtained.

According to Fig. 5, the distance element is composed of an exterior cylinder 19 with oil duct 20 opening close to the cylinder bottom behind the piston 21. This piston 21 has its part corresponding to the piston rod formed into a cylinder which encloses a piston 22 with a piston rod 23, having an oil duct 24, which is connected to the oil supply by a connection piece 25 and conducts the oil behind the piston 22 which has a central ledge 26 with smaller diameter than the piston, so that the oil is conducted into the ring-formed space between the piston in its inner position and the bottom of the cylinder 21.

The embodiment according to Fig. 6 differs from that illustrated in Fig. 5 by the oil duct arrangement of the inner cylinder. A cylinder 27 with an oil duct 28 encloses a cylinder-formed piston 29. This encloses in turn a piston 30 with a piston rod 31, whose end projects in the initial position of the element from cylinder 29. The oil is conducted behind the piston 30 through a duct 32′ in the back of the piston cylinder. The duct 32′ connects the inside of the cylinder 29 with the space between the cylinder 29 and the cylinder 27. In its wall there is a duct 32 which in its turn is connected to the oil pipe. In the front end of the cylinder 27 is a circular oil groove 32″.

Fig. 7 shows a double element composed of two telescopic elements according to Fig. 6 as illustrated in Fig. 3.

In the above mentioned embodiments the elements are also accurately adjusted to the desired partial or total element alterations, which are exact and specific for every element. The partial distance alterations occurring within the same hydraulic unit do not have to be equal. Although only two telescopically arranged hydraulic units have been illustrated it is evident that three or several elements can be arranged in a similar manner. Especially this can be done in connection with the following embodiment of the invention although for the sake of clarity the example is limited to four elements.

As Fig. 8 shows, the hydraulic unit in its initial form is a cylinder means 33, whose bottom part has an inner diameter, which is a little smaller than the diameter of the opposite end, in order to form a shoulder on which a movable slide 34 abuts when pushed in. Between the bottom of the cylinder means 33 and the slide 34 there is a membrane container 35, to which an oil duct 36 conducts going through the cylinder wall. Such a hydraulic unit is particularly suitable in cases of small distance alterations owing to the fact that the extension of the element in the expansion direction can be made very small. The membrane container can be made in metal, but a membrane in the form of a rubber bag with inlet respectively outlet for the pressure medium is preferred.

Fig. 9 shows a telescopic unit of membrane type. One hydraulic unit 37 according to Figure 8 is entirely made a movable part of a surrounding cylinder means 38 with a membrane 39. The cylinder means 38 in its turn is fixed to a surrounding cylinder means 40. In the ring-formed room between them there is a ring-formed membrane container 41. The means 40 is in its turn surrounded by an exterior means 42 with a ring-formed membrane container 43. The oil supply to the different hydraulic units within each other can be arranged, as mentioned, through oil ducts in the bottom of the cylinder means, which oil ducts conduct to the respective membranes.

Fig. 10 shows a double element composed of two hydraulic units according to Fig. 9.

To avoid a flexible feeding pipe, the measuring device shown in Fig. 11 has no separate cylinder, the parts of the different elements being arranged in a common cylinder 44, which at the same time is the supporting and guiding means of the measuring device. The element parts consist of a movable central ring 45 with flange casings 46, 47 fixed to its center aperture; these flange casings are attached by a screw bolt 48. The movable parts, corresponding to the pistons, are composed of two annular pistons 49 and 50 with a stepped cross section. The left part of the element is formed by an element of the type according to Fig. 1 and its right part of the element type according to Fig. 2. These elements can be, of course, be of the same type and can also be used separately, though the design shows them arranged within a double element. The oil supply to the respective element is effected through respective ducts 51 and 52, which are comparatively large in proportion to the axial motion of the hydraulic unit. In this way the connection to the annular rooms 53 and 54 being between the annular pistons and the cylinder wall 44 is always assured. The end of the ring-formed piston 49 projects beyond the end plane of the flange case 46 and the specific distance alteration of the element is $l_4$. The adjacent similar distance element abuts against the end plane of the ring-formed piston 49. The end plane of the ring-formed piston 50, when in rest, does not project beyond the end plane of the flange case 47, against which the adjacent distance element abuts. When the ring-formed piston is pushed out, the specific distance alteration of the element is $l_5$. If hydraulic units of the type illustrated are used in end to end position, a circular intermediate plate, not illustrated by the design, must be fixed between them.

In the foregoing different embodiments of the hydraulic units were described. Now a measuring device according to Fig. 12 will be described. In the illustrated embodiment it consists of a metal pipe constituting a supporting and guiding means 55. In the pipe there is fixed a series of hydraulic units according to Fig. 3. One end of the pipe is shut with an end plate 56, which is provided with a central threaded aperture into which an adjusting bolt and nut 57, 58 are threaded. The other end of the pipe is also shut with a screw cap 59. The pipe has on one side a longitudinal slot 60 and a diametrically opposed slot 61. The device has a fixed measuring point 62 and a movable one 63, which through a device 64 abutting on the pipe is connected with the element series through the slot 61. The hydraulic units in their initial position are pressed together by a coil spring 65. The hydraulic units are for instance of the character that the elements 66, 67 control the measuring range 0.1–0.9, the elements 68, 69 the measuring range 1–9 mm., the elements 70, 71 the measuring range 10–90 mm., and the element 72 controls the measuring range 100–300 mm. By the aid of this device measurements within the whole range 0–399.9 mm. can be carried out with intervals of 0.1 mm. The specific exact distance alterations are in this case 0.1 and 0.1 mm. for the element 66 and 0.2 and 0.5 mm. for the element 67. The elements 68, 69 have the same proportion multiplied by 10 and the elements 70, 71 likewise multiplied by 100. The element 72 has the specific distance alteration 100 and 200 mm., thus a total of 300 mm. Of course another proportion between the scalar members in every decade measure interval than 1:1:2:5, as mentioned, is possible, for instance 1:2:3:4.

The oil is conducted to the elements 70, 71 and 72 through flexible pressure ducts attached to the pipe connection pieces, fixed to the respective element and moving thus in the slot 60 with the distance element. The elements 66–69 are arranged in another manner, which is fit in cases where the element motion is minute. The oil pipes are attached to connecting pieces in the pipe 55. The ducts 73, 74 pass through the pipe wall to the inner side of the pipe wall. These ducts widen in the displacement direction of the element and the oil ducts of the elements are opposite to them as the section of the element 68 shows. The connection between the inner and the exterior oil supply of the element is preserved in this manner, when the element moves within its motion interval. The hydraulic units are thus fitted as pistons in the pipe 55 and if necessary packing arrangements can be used, for instance packing rings. The pipe 55 must be provided with an outlet 75 for leakage oil arranged between the elements. The device can, of course, be provided with changeable measuring points, so that for instance the inner pipe diameters can be measured, or arranged as a gauge for measuring the depth of apertures.

The oil supply from the pressure oil source to every distance element is regulated by valves associated with every element, which will be described later on. The valve set with operating buttons is connected with the device to form a unit, which is attached to the oil circulation system through an inlet and an outlet duct.

When using the gauge, the 0-adjustment is carried out by the screw 57. For obtaining for instance the measure 241 8/10 mm., the oil is to be conducted through the valve arrangement to one of the distance elements of the element 71—200 mm.—and further to both distance elements of the element 70—40 mm. Then the oil is to be conducted to one side of the element 68—1 mm. and to both sides of the element 67—0.7 mm.—and to one side of the element 66—0.1 mm. In order to get 242 mm., the oil is guided away from the elements 66 and 67, the spring 65 pressing the gauge to 241 mm., and then the oil is also conducted to the other side of the element 68, the measure 242 mm. being thus obtained. These operations can, of course, be simultaneously carried out.

The device is not only limited to be a precision gauge for accurate measuring. Another purpose of the invention is to produce a device for accurate adjustment of a body in a predetermined position in relation to a fixed point. Figs. 13 and 14 show the principles of this arrangement in connection with a machine tool the table of which, respectively the work piece fixed on it, is adjustable in relation to the working tool.

As Fig. 13 shows, the column of hydraulic unit is arranged in the same way as in the gauge according to Fig. 12. The elements are thus placed in a pipe 76 which tightly envelops them. The hydraulic units 77–82 are of the type according to Fig. 7, but especially the elements 81, 82 can be of the membrane type according to Fig. 8. The elements 77, 78 are of the type according to Fig. 3. The oil supply pipes of the elements 77–90 project out through a longitudinal slot 83, while the oil supply of the elements 81, 82 is arranged in the same way as that of the elements 66–69 in Fig. 12. The pipe 76 is at both ends attached to the support 84. A zero-adjustment device 85 composed of a bolt and nut and a stop nut 86 is fixed to the one end of the pipe 76. Through a bushing 87 a push rod 88 projects beyond the pipe end where it is attached to a yoke 89. In order to hold the distance elements close to each other, the spring 65 is here replaced by two hydraulic cylinders 90, 91 which act opposite to the expansion direction of the distance elements. The total effective surface of the hydraulic cylinders is of such a nature that the contracting force is always weaker than the expansion force of the distance elements. The oil pressure is supplied to the cylinders through the oil pipes 92, 93. The piston rods 94, 95 of the auxiliary cylinders are attached to the yoke 89. The guides, on which the operating table 96 slides are fixed on the machine tool bed 84; one of these guides 97 can be seen in Fig. 13. The operating table 96 is connected with the yoke 89 by an arm 98. The indicated distance elements series is designed to control the range 0–999.99 mm. with intervals of 0.01 mm. In this case the specific exact distance alterations of the distance elements are also provided within every decade interval in the proportion 1:1:2:5, which proportion expressed in millimetres, represents the scalar members of the specific distance alterations of the hydraulic unit 80. The corresponding scalar number for the element 79 is ten times greater and for the elements 66, 67 hundred times greater, while the scalar numbers for the elements 81 and 82 are 1/10, respectively 1/100 of the scalar number for the element 80, if maintaining the just mentioned mutual proportion.

Fig. 15 shows as an example an operating plate 99 of the described adjustment device. As the column by hydraulic units is composed of twenty particular hydraulic units, the operating plate has twenty push buttons 100, one for every element. Every button actuates an oil valve of customary construction, as in an enlarged size is illustrated by Fig. 16. Every push button is provided with a marking of the specific distance alteration of the hydraulic unit it is designed to actuate, as illustrated by Fig. 15. The oil valve is composed of a triple piston device 102, fixed in the aperture 101 in the operating plate 99. This triple piston arrangement is illustrated as being in a position of rest by means of a spring 103. An oil duct 104 conducts oil to the hydraulic unit and another oil duct 105 with connection ducts to the different valves leads to an oil outlet 107 to an oil sump 108. A hydraulic pump 109 or a pressure medium accumulator, not illustrated, maintains the necessary pressure in the system. The pressure oil is conducted into the valve through a duct 110 with a connection duct 111 between the different valves. The system has an overpressure safety means 112; the oil is further conducted to the auxiliary cylinders 90, 91, of which one is indicated. When the button 100 is pushed, the hydraulic unit is connected to the pressure side of the system and expands until it reaches its specific distance alteration. In order to keep the valve in this position, there is a known index lock arrangement 113 in the valve. In order to return the actuated buttons, respectively the valves, in a convenient way to their normal positions, the push button 114 is used, which operates a hydraulic valve. Upon pushing down the button 114, the pressure oil is conducted to the lower part of the lower cavity of every operating valve, which cavities are connected to the gathering duct 115. The actuated operating buttons are returned, overcoming the resistance of the index lock arrangement 113, the hydraulic units, which earlier were subject to a pressure actuation, are connected to the oil sump, and the auxiliary cylinders 90, 91 bring the adjustment device back to its zero-position. By pushing down all operating buttons 100, the maximum displacement of the adjustment device is attained, whereupon by handlifting the appropriate operating buttons, the desired reduction of the maximum displacement is attained in order to get the correct adjustment.

It is evident that the operating plate can be provided with buttons numbered in every button row from 1 to 9. When the button marked, for instance, "8" is pushed down, the valves, which operate the hydraulic units with the numbers 1, 2, and 5, are actuated simultaneously. Especially in connection with such a device, it is advantageous to use electro-magnetically operated valves.

As an example of one of the many combination possibilities Fig. 17 shows such a device divided into two separate parts which actuate the operating table of a machine tool. The machine bed 116 is only indicated in order to mark the supports of the device. A distance adjustment device 117 is fixed to the bed and is composed of a column of hydraulic units, which cover, for instance, the range 0.01–0.99. The oil ducts 118 are fixed to the case of the distance adjustment device 117. Another distance adjustment device 119 is in its total movable in axial direction as also its particular hydraulic units in relation to the case. Its range is for instance 1–999 mm. The oil conducts 120 are flexible. In order to get, when necessary, the effect of both devices 117 and 119 added together, a lever having two arms 121 is used, one arm of which in the illustrated case is two times as long as the other. In both ends it has suitable elements 122, 123 as for instance pulleys, ridges, balls, and similar. The pulley 122 abuts against the push rod 134 and the pulley 123 against the rear end of the distance adjustment device 119. In resting position or if the device 117 does not operate, it abuts against a ledge 125 in the bed 116. The push rod 126 is by means of an arm 127 connected to the operating table 128. The necessary initial adjustment of the elements is produced by means of not illustrated adjustment screws as above described. The resetting device is also not illustrated in the design.

Fig. 18 shows the transverse section of a preferred embodiment, which on the whole corresponds to the device given in Figs. 13 and 14, and Fig. 19 shows an operating plate for the device in question. In the device only distance elements of the type given in Fig. 11 are used, while the movement of all ring-formed pistons is arranged in the same way as the movement of the left ring-formed piston shown in Fig. 11. The coupling of the distance elements to the operating valve is given in one case, while the coupling of the other, which is going off in an analogous way, is only indicated in order to obtain a better surveyability. In the case displayed eight operating valves are required. Their positions on the operating plate are shown with indication of the numerical value of each operating valve.

The numerals on the left side of Fig. 19 indicate 0.01 mm., 0.1 mm., 1 mm., 10 mm., and 100 mm. and refer to the corresponding line of buttons. If for instance the button 159 provided with indicia 1 is pressed, the 1 mm. hydraulic unit is moved for 1 mm. If the button 163 is pressed, the column of hydraulic units expands for five times 1 mm., that is 5 mm. If the button marked 2 of the 10 mm. line is pressed, the hydraulic units will expand two times 10 mm., that is 20 mm.

The device consists of a cylinder 129, which is closed at both ends. In this cylinder there are four double distance elements 130–133 fitted in with packings thus that they can glide in it. The specific distance alterations of these elements are as follows: 130 1 mm. and 1 mm.; 131 2 mm. and 5 mm.; 132 10 mm. and 10 mm., and 133 20 mm. and 50 mm. For operating there are required eight valves such as for instance shown in the transverse section and coupled up in order to affect the right part of the distance element 130 whenever the valve, respectively, its button 134 is pushed down. By means of the device every wanted change of length between 0 and 99 mm. can thus be obtained at intervals of exactly 1 mm.

The cylinder 129 is fixed on the supporting means 135 and at said end provided with a closure 136, having a hole 137, an oil pipe-line 138 leading to the oil pump 139. Through this oil-pipe-line oil, which has leaked through the packings of the distance elements into such space as 140, is removed. The annular piston of the distance element 133 is attached to the cylindrical end 141, of a push rod 142 passing through portion 148 of the cylinder 129. The end of the push rod is fastened to a part 143 of the movable operating table; on this operating table the work piece will be fixed. The zero position of the device is adjusted by means of a screw-nut 144 and a counter screw-nut 145. Instead of by means of separate cylinders 90, 91 (Fig. 4), the opposite force required for adjustment of the device to the zero position is produced by conducting the pressure oil from the hydraulic pump 147 through an oil duct 146 into the cylinder 129 between its portion 148 and the piston-shaped end 141 of the push rod 142. By means of the push button 134 a three way valve 149 is operated. The spring 150 is holding the valve in its inoperative position (0-position). In this position the pressure side of the pump 147 is connected to the inner part 151 of the valve and the oil pressure does not act on the right part of the distance element. If the button 134 is pushed down, it remains in this position owing to the lock 152. In this case the oil in the pressure duct 153 is connected through the valve 151 to the oil duct 154 communicating with the space 156 of the distance element 130 at the rear of the respective annular piston 155. The piston and thus the push rod 142 are displaced 1 mm. to the right until the annular piston strikes the stop 157 and takes thus a corresponding position as the left piston 158 of the distance element 130, which piston is under pressure, the associated operating button 159 being depressed. Piston 158 may be fixed to member 136. In the shown position of the distance elements there are, besides the just mentioned button, also the push buttons 160, 161 and 162, together with the corresponding valves, pushed down, while besides the push button 134 also the push buttons 163, 164 and 165 are in an inoperative position. At the oil apertures of the cylinder 129 the reference numerals of the corresponding push buttons are indicated in parenthesis. The three-way (0-position) valve 166 is during operation in the position indicated by lines and the space 167 of the valve 149 thus connected to the oil pump 139. If the distance element series is to be returned to the 0-position, the valve 166 is turned to the shown position. In this case the pressure oil in the duct 153 can act on the valve 149, which is returned to its upper inoperative position. The oil in the oil duct 154 can, when a piston is returned to the 0-position by the valve 149, freely run back through the oil duct 168 to the oil pump 139. In the oil pressure system there a safety valve is provided.

In the position shown the distance element device has thus displaced the operating table 63 mm. from a given 0-position.

In order to obtain this position the device has to be operated as follows: The button 159 is pressed which results in a 1 mm. movement of the hydraulic unit 130, pressing of button 160 displaces the unit 131 for 2 mm., button 161 displaces a unit for a distance of 10 mm., and finally the button 162 is pressed and displaces the unit 133 for a distance of 50 mm. All the other buttons remain in the zero position shown in the lower portion of Fig. 18 for a button 134.

By means of a combination of the described kind, and, in many cases desirable, space economy is obtained. Furthermore, the "fine"-adjustment device needs not to be exposed to pressure actuations in those cases when it is not necessary, since the ledge 125 absorbs them. An essential advantage is, that the device 117 owing to the lever proportion 2:1 can be made with greater tolerances and with elements having greater distance alterations, i. e. the specific distance alteration of the device will in this case be $2 \times 0.01 - 0.99 = 0.02 - 1.98$ mm. with intervals of 0.02 mm.

It is also without anything further evident, that the invention is not limited to a device for adjustment of a work piece in relation to a tool, but the device can also be made to actuate the tool in order to adjust it in relation to the work piece, as also both kinds of adjustment operations are possible.

What we claim is:

1. A measuring and actuating device comprising, in combination, supporting means including elongated tubular guiding means formed with a plurality of radial conduits; a set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber communicating with one of said conduits, and two annular stop members mounted on said transversely extending wall member, each of said stop members passing through one of said annular pistons and having a radial projection limiting movement of the associated pistons, each of said hydraulic units being longitudinally expandable between two predetermined limits from a compressed condition to an expanded condition, and compressible from an expanded condition to a compressed condition, there being groups of hydraulic units provided, each of said groups of hydraulic units consisting of hydraulic units having a difference in length in expanded and compressed condition in the range of a different denominational order of a measure of length, said hydraulic units constituting a longitudinally expandable and compressible column having a length variable between two predetermined limits; adjustable stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and in compressed condition of said hydraulic units; a set of fluid supply means supplying an actuating fluid through one of said conduits separately to each chamber of said hydraulic units for expanding the same; hydraulic pressure means abutting at one end thereof against said supporting means and at the other end thereof against said other end of said column and forcing said hydraulic units from expanded to compressed condition; a further fluid supply means for actuating said hydraulic pressure means; and operating means for separately actuating each of said fluid supply means.

2. A measuring and actuating device comprising, in combination, supporting means including elongated tubular guiding means formed with a plurality of radial conduits, a set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber communicating with one of said conduits, and two annular stop members mounted on said transversely extending wall member, each of said stop members passing through one of said annular pistons and having a radial projection limiting movement of the associated piston, each of said hydraulic units being longitudinally expandable between two predetermined limits from a compressed condition to an expanded condition, and compressible from an expanded condition to a compressed condition, said hydraulic units constituting a longitudinally expandable and compressible column having a length variable between two predetermined limits; stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and in compressed condition of said hydraulic units; a set of fluid supply means supplying an actuating fluid through one of said conduits separately to each chamber of said hydraulic units for expanding the same; pressure means abutting at one end thereof against said supporting means and at the other end thereof against said other end of said column and forcing said hydraulic units from expanded to compressed condition; and operating means for separately actuating each of said fluid supply means.

3. A measuring and actuating device comprising, in combination, supporting means including elongated tubular guiding means formed with a plurality of radial conduits; a set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber communicating with one of said conduits, and two annular stop members mounted on said transversely extending wall member, each of said stop members passing through one of said annular pistons and having a radial projection limiting movement of the associated piston, each of said hydraulic units being longitudinally expandable between two predetermined limits from a compressed condition to an expanded condition, and compressible from an expanded condition to a compressed condition, said hydraulic units constituting a longitudinally expandable and compressible column having a length variable between two predetermined limits; stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and compressed condition of said hydraulic units; stationary measuring means secured to said supporting means; movable measuring means secured to said actuated member and cooperating with said stationary measuring means to measure distances; a set of fluid supply means supplying an actuating fluid through one of said conduits separately to each chamber of said hydraulic units for expanding the same; pressure means abutting at one end thereof against said supporting means and at the other end thereof against said other end of said column and forcing said hydraulic units from expanded to compressed condition; and operating means for separately actuating each of said fluid supply means.

4. In a machine tool, in combination, supporting means including elongated tubular guiding means formed with a plurality of radial conduits; a set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber communicating with one of said conduits, and two annular stop members mounted on said transversely extending wall member, each of said stop members passing through one of said annular pistons and having a radial projection limiting movement of the associated piston, each of said hydraulic units being longitudinally expandable between two predetermined limits from a compressed condition to an expanded condition, and compressible from an expanded condition to a compressed condition, said hydraulic units constituting a longitudinally expandable and compressible column having a length variable between two predetermined limits; stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and in compressed condition of said hydraulic units and adapted to support a tool; a work-piece supporting table fixedly secured to said actuated member; a set of fluid supply means supplying an actuating fluid through one of said conduits separately to each chamber of said hydraulic units for expanding the same; pressure means abutting at one end thereof against said supporting means and at the other end thereof against said other end of said column and forcing said hydraulic units from expanded to compressed condition; and operating means for separately actuating each of said fluid supply means.

5. A measuring and actuating device comprising, in combination, supporting means including elongated tubular guiding means formed with a plurality of radial conduits; a set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber, collapsible and expandable container means located in at least one chamber and communicating with one of said conduits, and two annular stop members mounted on said transversely extending wall member, each of said stop members passing through one of said annular pistons and having a radial projection limiting movement of the associated piston, each of said hydraulic units being longitudinally expandable between two predetermined limits from a compressed condition to an expanded condition, and compressible from an expanded condition to a compressed condition, said hydraulic units constituting a longitudinally expandable and compressible column having a length variable between two predetermined limits; stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and in compressed condition of said hydraulic units; a set of fluid supply means supplying an actuating fluid through one of said conduits separately to each chamber of said hydraulic units for expanding the same; pressure means abutting at one end thereof against said supporting means and at the other end thereof against said other end of said column and forcing said hydraulic units from expanded to compressed condition; and operating means for separately actuating each of said fluid supply means.

6. A measuring and actuating device comprising, in combination, supporting means including elongated tubular guiding means formed with a plurality of radial conduits; a first set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber communicating with one of said conduits, and two annular stop members mounted on said transversely extending wall member, each of said stop members passing through one of said annular pistons and having a radial projection limiting movement of the associated piston; a second set of hydraulic units mounted in the interior of said guide means end to end, each unit of said second set including one cylinder means formed with a conduit having one end on the inner surface, and the other end on the outer surface of said cylinder means; transversal closure means closing one end of said cylinder means; at least one piston means mounted in said cylinder means movably in axial direction between two positions, and at least in one of said two positions projecting out of the other end of said cylinder means, said piston means defining in said cylinder means together with said transversal closure means a chamber communicating with said one end of said conduit; a stop member engaging said piston means in said one projecting position, each of said hydraulic units being longitudinally expandable between two predetermined limits from a compressed condition to an expanded condition, and compressible from an expanded condition to a compressed condition, there being groups of hydraulic units provided, each of said groups of hydraulic units consisting of hydraulic units having a difference in length in expanded and compressed condition in the range of a different denominational order of a measure of length, said hydraulic units constituting a longitudinally expandable and compressible column having a length variable between two predetermined limits; adjustable stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and in compressed condition of said hydraulic units; a set of fluid supply means supplying an actuating fluid through one of said conduits separately to each chamber of said hydraulic units for expanding the same; hydraulic pressure means abutting at one end thereof against said supporting means and at the other end thereof against said other end of said column and forcing said hydraulic units from expanded to compressed condition; a further fluid supply means for actuating said hydraulic pressure means; and operating means for separately actuating each of said fluid supply means.

7. A measuring and actuating device comprising, in combination, supporting means including elongated tubular guiding means formed with a plurality of radial conduits; a set of hydraulic units mounted in the interior of said guiding means end to end, at least two of said hydraulic units including an annular wall member transversely extending through said tubular guiding means and slidably mounted therein, two annular pistons each piston slidably mounted on one side of said transversely extending wall member and defining with the same a chamber, collapsible and expandable container means located in at least one chamber and communicating with one of said conduits, and two annular stop members mounted on said transversely extending wall member, each of said stop members passing through one of said annular pistons and having a radial projection limiting movement of the associated piston, each of said hydraulic units being longitudinally expandable between two predetermined limits from a compressed condition to an expanded condition, and compressible from an expanded condition to a compressed condition, there being groups of hydraulic units provided, each of said groups of hydraulic units consisting of hydraulic units having a difference in length in expanded and compressed condition in the range of a different denominational order of a measure of length, said hydraulic units constituting a longitudinally expandable and compressible column having a length variable between two predetermined limits; adjustable stop means mounted on said supporting means at one end of said elongated guiding means engaging one end of said expandable and compressible column; an actuated member engaging the other end of said column and mounted on said supporting means movably between two positions corresponding to the longitudinal extension of said column in expanded and in compressed condition of said hydraulic units; a set of fluid supply means supplying an actuating fluid through one of said conduits separately to each chamber of said hydraulic units for expanding the same; hydraulic pressure means abutting at one end thereof against said supporting means and at the other end thereof against said other end of said column and forcing said hydraulic units from expanded to compressed condition; a further fluid supply means for actuating said hydraulic pressure means; and operating means for separately actuating each of said fluid supply means.

References Cited in the file of this patent

UNITED STATES PATENTS

| Number | Name | Date |
|---|---|---|
| 691,692 | Zweigbergk | Jan. 21, 1902 |
| 1,561,342 | Martin | Nov. 10, 1925 |
| 1,684,033 | Josephs, Jr. | Sept. 11, 1928 |
| 2,197,867 | Klement | Apr. 23, 1940 |

FOREIGN PATENTS

| 243,620 | Switzerland | Jan. 16, 1947 |